United States Patent
Abe et al.

(10) Patent No.: US 9,956,938 B2
(45) Date of Patent: May 1, 2018

(54) VEHICULAR POP-UP HOOD DEVICE

(71) Applicant: TAKATA CORPORATION, Tokyo (JP)

(72) Inventors: Kazuhiro Abe, Tokyo (JP); Atsushi Noguchi, Tokyo (JP); Koji Inuzuka, Tokyo (JP); Takayuki Kawano, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days. days.

(21) Appl. No.: 15/398,167

(22) Filed: Jan. 4, 2017

(65) Prior Publication Data

US 2017/0203713 A1     Jul. 20, 2017

(30) Foreign Application Priority Data

Jan. 20, 2016  (JP) .................... 2016-008907
Mar. 23, 2016  (JP) .................... 2016-058855

(51) Int. Cl.
*B60R 21/38* (2011.01)
*F15B 11/10* (2006.01)
*F15B 15/14* (2006.01)

(52) U.S. Cl.
CPC ............... *B60R 21/38* (2013.01); *F15B 11/10* (2013.01); *F15B 15/1423* (2013.01); *B60Y 2306/01* (2013.01); *B60Y 2400/40* (2013.01); *B60Y 2410/124* (2013.01)

(58) Field of Classification Search
CPC ...... B60R 21/38; F15B 15/1423; F15B 11/10; B60Y 2306/01; B60Y 2410/124; B60Y 2400/40
See application file for complete search history.

(56) References Cited

U.S. PATENT DOCUMENTS

| | | | |
|---|---|---|---|
| 8,534,410 B2* | 9/2013 | Nakaura | B60R 21/38 180/274 |
| 9,573,560 B1* | 2/2017 | Narita | B60R 21/38 |
| 9,758,125 B2* | 9/2017 | Matsushima | B60R 21/38 |
| 2008/0174124 A1* | 7/2008 | Takahashi | B60R 21/34 292/45 |
| 2009/0223360 A1* | 9/2009 | Aoki | B60R 21/38 92/15 |
| 2009/0266638 A1* | 10/2009 | Hayashi | B60R 21/38 180/274 |

(Continued)

FOREIGN PATENT DOCUMENTS

EP    1 338 483 A2    8/2003
EP    2 187 065 A1    5/2010

(Continued)

*Primary Examiner* — Darlene P Condra
(74) *Attorney, Agent, or Firm* — Foley & Lardner LLP

(57) ABSTRACT

According to the present invention, a vehicular pop-up hood device includes a cylinder, a piston rod that can protrude from a front end of the cylinder, a gas generator to urge the piston rod, the gas generator provided at a side of a rear end of the cylinder, and a bracket to attach the cylinder to a vehicle body. The bracket includes a top portion engaged with the front end of the cylinder, and an overhanging portion for attachment to the vehicle body, the overhanging portion overhanging from the cylinder in a direction intersecting with an axial direction of the cylinder.

9 Claims, 5 Drawing Sheets

(56) References Cited

U.S. PATENT DOCUMENTS

| | | | |
|---|---|---|---|
| 2016/0114759 A1* | 4/2016 | Takaya | B60R 21/38 |
| | | | 102/530 |
| 2017/0036642 A1* | 2/2017 | Nomura | B62D 25/12 |
| 2017/0136643 A1* | 5/2017 | Bagley | B26D 1/03 |
| 2017/0136985 A1* | 5/2017 | Narita | B62D 25/10 |

FOREIGN PATENT DOCUMENTS

| JP | 2010-030496 A | 2/2010 |
|---|---|---|
| JP | 2015-085867 A | 5/2015 |
| JP | 5952747 B2 | 7/2016 |

\* cited by examiner

VEHICULAR POP-UP HOOD DEVICE

CROSS REFERENCE TO RELATED APPLICATION

This application is based upon and claims benefit of priority from the Japanese Patent Application No. 2016-008907, filed on Jan. 20, 2016, and the Japanese Patent Application No. 2016-058855, filed on Mar. 23, 2016, the entire contents of which are incorporated herein by reference.

FIELD OF THE INVENTION

The present invention relates to a vehicular pop-up hood device that pushes up a rear end portion of a hood when a vehicle collides with a collision body such as a pedestrian.

BACKGROUND OF THE INVENTION

In recent years, there is being developed a vehicular pop-up hood device that pushes up a rear end portion of a hood when a vehicle collides with a collision body such as a pedestrian to receive the collision body with the hood and reduce an impact in a viewpoint of pedestrian protection etc.

In a vehicular pop-up hood device disclosed in patent document 1 (Japanese Patent Application Publication No. 2014-133535), actuators are arranged at both sides of a rear end portion of a hood. The actuators are activated at a collision or the like with a collision body, and push up a rear portion of the hood. The actuators each include a cylinder, a piston in the cylinder, a piston rod continuous to the piston, a gas generator, etc. When the gas generator is activated, the piston is pushed up, and the piston rod protrudes upward. The piston is pushed up until the piston comes into contact with a stopper portion (in patent document 1, referred to as front end wall portion) at an upper portion of the cylinder.

FIG. 3 and Paragraph [0023] in patent document 1 describe that the vehicular pop-up hood device (a hood panel flip-up device) is attached to a vehicle body member (a hood ridge reinforcement) through a bracket having a U-like cross-sectional shape. To be specific, the cylinder of the vehicular pop-up hood device is sandwiched between the bracket having the U-like cross-sectional shape and the hood ridge reinforcement of the vehicle body, and the bracket is fixed to the hood ridge reinforcement by bolts.

Patent document 2 (Japanese Patent Application Publication No. 2009-79761) describes that a vehicular pop-up hood device is entirely covered with a coating by fluorocarbon resin coating.

With the attachment structure like patent document 1, in which the vehicular pop-up hood device is attached by sandwiching the cylinder of the vehicular pop-up hood device between the bracket having the U-like cross-sectional shape and the hood ridge reinforcement of the vehicle body and by fixing the bracket to the hood ridge reinforcement by the bolts, it is required to firmly restrain a motion of the cylinder in the up-down direction when the vehicular pop-up hood device is activated. Hence, it is required to strongly sandwich and hold the cylinder between the bracket and the hood ridge reinforcement, to increase the strength and rigidity of the bracket, and to increase a cramping force of the bolts, resulting in an increase in cost.

Also, since the stopper portion (the front end wall portion) is required to strongly receive the piston when the piston comes into contact with the stopper portion, coupling between the stopper portion and the cylinder is required to be strong, resulting in an increase in cost.

SUMMARY OF THE INVENTION

According to one aspect of the present invention, there is provided a vehicular pop-up hood device comprising: a cylinder; a piston rod that can protrude from a front end of the cylinder; a gas generator to urge the piston rod, the gas generator provided at a side of a rear end of the cylinder; and a bracket to attach the cylinder to a vehicle body, wherein the bracket includes a top portion engaged with the front end of the cylinder, and an overhanging portion for attachment to the vehicle body, the overhanging portion overhanging from the cylinder in a direction intersecting with an axial direction of the cylinder.

According to one aspect of the present invention, there is provided a vehicular pop-up hood device comprising: an actuator including a cylinder, a piston rod that can protrude from a front end of the cylinder, and a gas generator to urge the piston rod, the gas generator provided at a side of a rear end of the cylinder; and a bracket to attach the actuator to a vehicle body, wherein the vehicular pop-up hood device includes a rear-end-side cover part covering a rear end portion of the vehicular pop-up hood device and made of hot-melt synthetic resin, wherein a harness continuous to the gas generator is routed along an outer surface of the cylinder in a direction toward the front end of the cylinder, and wherein the harness is embedded in and fixed to the rear-end-side cover part.

According to one aspect of the present invention, there is provided a vehicular pop-up hood device comprising: an actuator including a cylinder, a piston rod that can protrude from a front end of the cylinder, and a gas generator to urge the piston rod, the gas generator provided at a side of a rear end of the cylinder; and a bracket to attach the actuator to a vehicle body, wherein the vehicular pop-up hood device includes a rear-end-side cover part covering a rear end portion of the vehicular pop-up hood device and made of hot-melt synthetic resin, and wherein a harness is continuous to the gas generator, and a connector portion of the harness connected with the gas generator is embedded in the rear-end-side cover part and pushed in at a side of the gas generator.

With the vehicular pop-up hood device of the present invention, when the gas generator is activated, the piston and the piston rod advance and push up the hood. According to the present invention, the piston advances (rises) until the piston comes into contact with the top portion of the bracket. According to the present invention, the piston is received by the bracket, and the top portion of the bracket is integrated with the overhanging portion. Since this overhanging portion is attached to the vehicle body member, the force when the top portion receives the piston is directly received by the vehicle body member, and is not transmitted to the cylinder.

Hence, according to the present invention, the strength required for fixing the cylinder to the vehicle body member can be low. Also, it is not required to provide a stopper portion for receiving the piston, integrally with the cylinder. Owing to this, the configuration cost of the cylinder is low. The bracket can be manufactured at low cost by executing sheet metal processing such as deep drawing processing.

According to the present invention, since upper and lower portions of the vehicular pop-up hood device are respectively covered with the cover parts made of the hot-melt synthetic resin, waterproof property can be increased.

Since the harness routed along the cylinder is embedded in the cover part at a lower side, a portion of the harness near the gas generator can be held.

DESCRIPTION OF THE EMBODIMENTS

Figure 1:
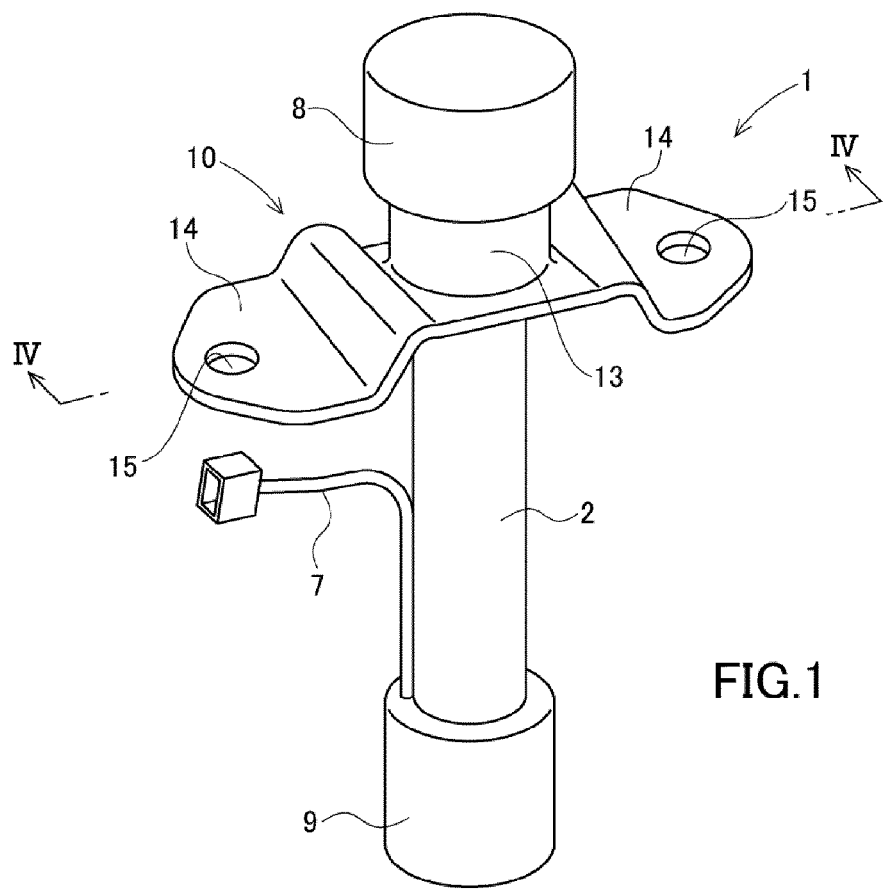
FIG. 1 is a perspective view of a vehicular pop-up hood device according to an embodiment.
Figure 2:
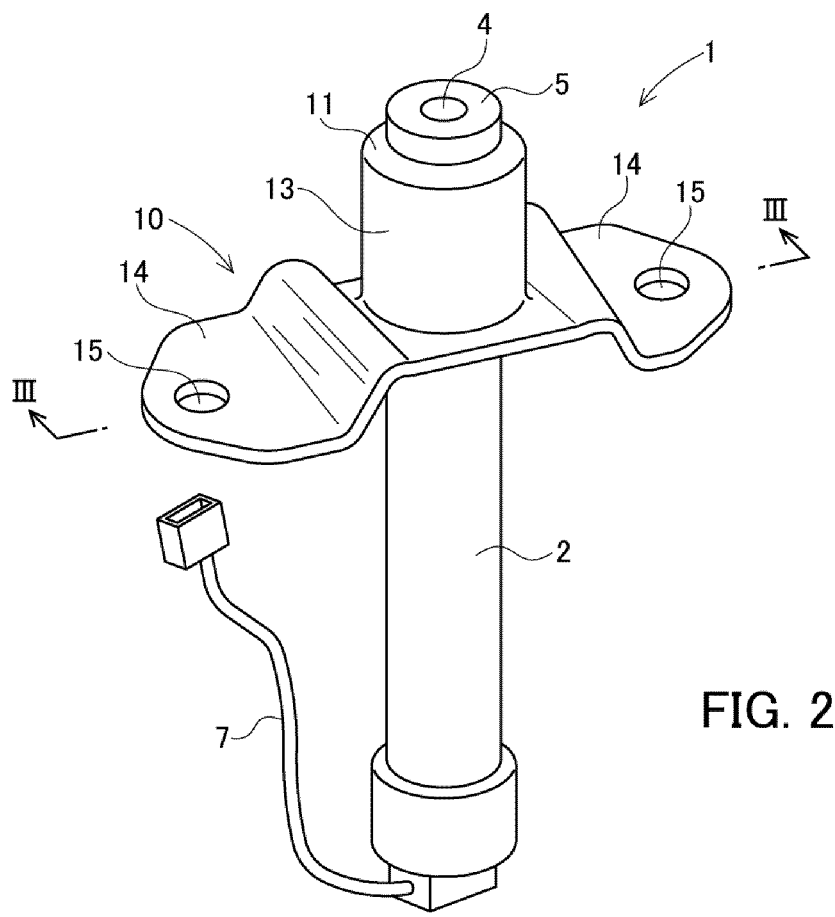
FIG. 2 is a perspective view of the vehicular pop-up hood device from which a cover part is removed.
Figure 3:
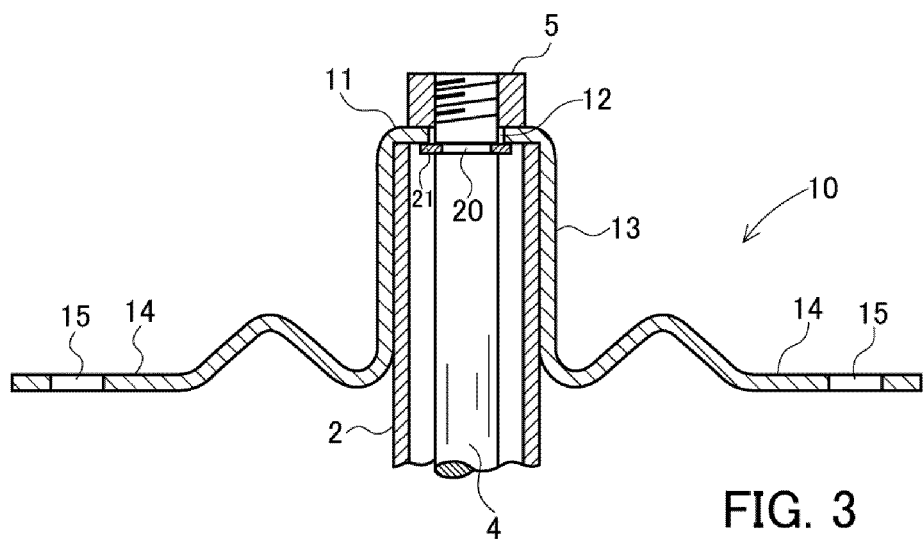
FIG. 3 is a cross-sectional view of an upper portion of the vehicular pop-up hood device taken along line III-III in FIG. 2.

A vehicular pop-up hood device 1 according to a first embodiment is described below with reference to FIGS. 1 to 4.

This vehicular pop-up hood device 1 includes a cylinder 2, a piston 3 in the cylinder 2, a piston rod 4 continuous to the piston 3, a nut 5 attached to a front end of the piston rod 4, a gas generator 6 provided at a rear end (a lower end) of the cylinder 2, a harness 7 continuous to a connector of the gas generator 6, a bracket 10 for attaching the vehicular pop-up hood device 1 to a vehicle body member, etc. Cover parts 8 and 9 for waterproof are provided respectively at a front end portion and a rear end portion of the vehicular pop-up hood device 1.

Figure 4:
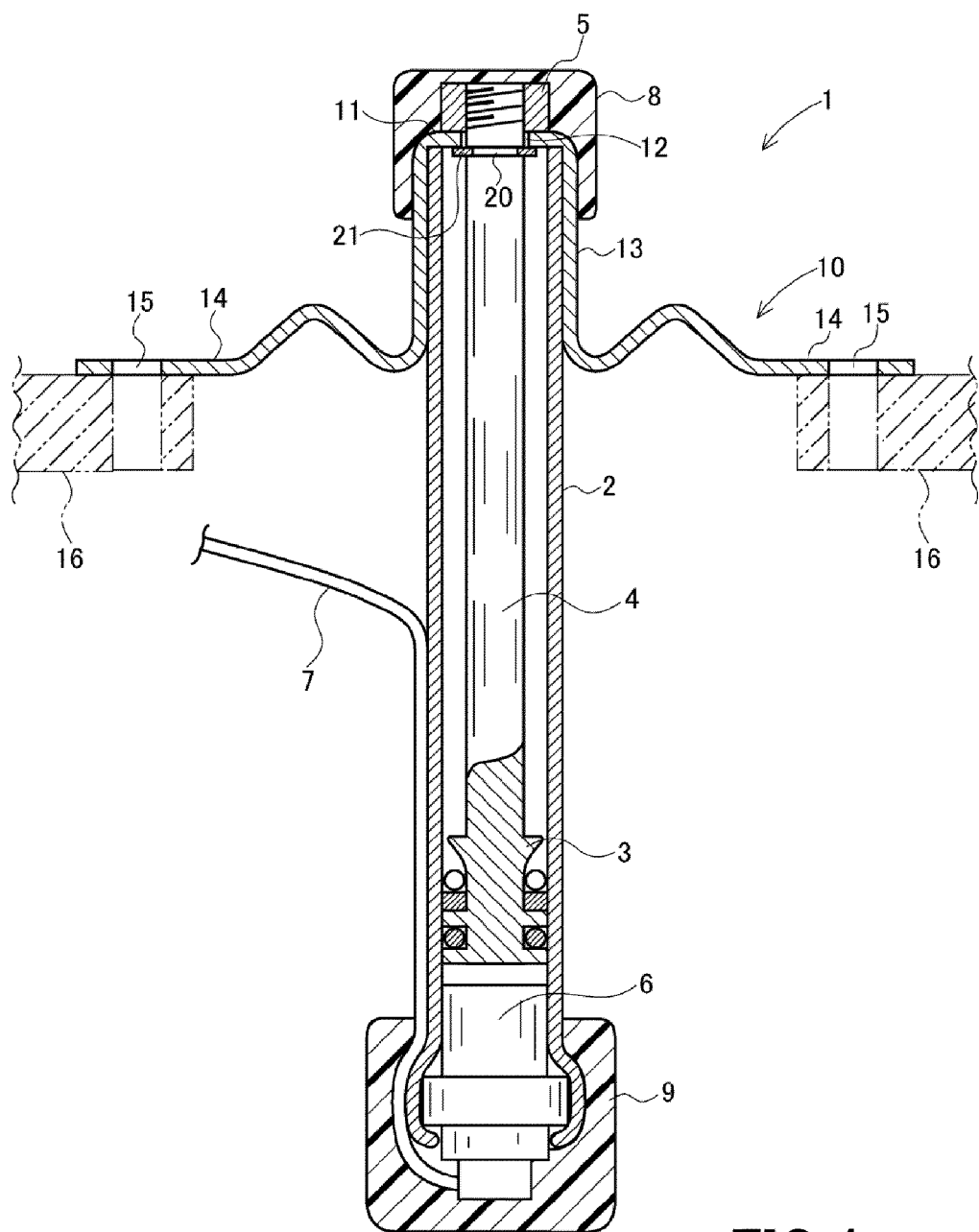
FIG. 4 is a cross-sectional view taken along line IV-IV in FIG. 1.

The bracket 10 is formed by executing sheet metal processing on a metal sheet, and has a top portion 11 overlapping a front end (upper end) surface of the cylinder 2; an opening 12 provided at the top portion 11, a cylindrical portion 13 serving as a connection portion being continuous to the top portion 11 and surrounding an upper portion of the cylinder 2; a pair of overhanging portions 14 being continuous to a lower end of the cylindrical portion 13 and overhanging (projecting) from the cylinder 2 in two directions along the diameter (a radial direction); and bolt insertion holes 15 provided at the overhanging portions 14. As shown in FIG. 4, the vehicular pop-up hood device 1 is fixed to a vehicle body member 16 (FIG. 4) by bolts (not shown) inserted into the bolt insertion holes 15.

The cylinder 2 has a cylindrical shape, and the top portion 11 is in contact with the upper end surface (the front end surface) of the cylinder 2.

In this embodiment, a portion of each overhanging portion 14 between the bolt insertion hole 15 and the cylindrical portion 13 is bent or curved in a wave shape. This waveshaped portion configures an impact absorption portion that is deformed when a hood (not shown) pushed up by the vehicular pop-up hood device 1 receives a pedestrian etc., and absorbs an impact.

The piston rod 4 protrudes upward through the opening 12 of the top portion 11. A male thread is cut in an outer peripheral surface of a front end portion of the piston rod 4, and the nut 5 is screwed on the male thread. The nut 5 has a larger outer diameter than the diameter of the opening 12. Also, the piston 3 has a larger diameter than the diameter of the opening 12.

As shown in FIG. 4, a groove 20 is made in a circular shape in the outer peripheral surface near the front end of the piston rod 4, and a stopper ring 21 is mounted at the groove 20. The stopper ring 21 faces a lower surface of the top portion 11.

The cover parts 8 and 9 are made of hot-melt synthetic resin. The cover part 8 covers an upper portion of the cylindrical portion 13, the top portion 11, the nut 5, and a top portion of the piston rod 4, and prevents water from entering the cylinder 2 through the opening 12.

The gas generator 6 is arranged in a lower portion of the cylinder 2 and is held by caulking. The cover part 9 covers the lower portion of the cylinder 2 and a lower portion of the gas generator 6, and prevents water from entering a lower portion of the vehicular pop-up hood device 1.

In this embodiment, the harness 7 continuous to the gas generator 6 is routed upward along an outer surface of the cylinder 2. A portion of the harness 7 near the gas generator 6 is embedded in the cover part 9 and hence is held. The harness 7 is fastened to the cylinder 2 by using a fastening band (not shown) at a position near the middle in the up-down direction of the cylinder 2. Since the harness 7 is routed upward along the outer surface of the cylinder 2, a connection (coupling) work to connect the harness 7 with a wiring member (not shown) provided at the vehicle body member 16 is easily executed.

As shown in FIG. 4, the overhanging portions 14 of the bracket of this vehicular pop-up hood device 1 overlap an upper surface of the vehicle body member 16, the bracket 10 is fixed to the vehicle body member 16 by bolts (not shown), and hence the vehicular pop-up hood device 1 is fixed to and arranged at the vehicle body member 16. In this fixed arrangement state, the cover part 8 at an upper end portion of the vehicular pop-up hood device 1 faces a lower surface of the hood (not shown).

When a collision with a pedestrian etc. is detected, the gas generator 6 is activated, and the piston rod 4 and the nut 5 break the cover part 8, protrude upward, and push up a rear portion of the hood. When the piston rod 4 protrudes, the stopper ring 21 is detached from the groove 20.

The piston rod 4 moves upward until the piston 3 comes into contact with the top portion 11 of the bracket 10. Since this bracket 10 is directly attached to the vehicle body member 16, the piston 3 is received by the top portion 11, and stopped.

The bracket 10 is mounted at the cylinder 2 by fitting the cylindrical portion 13 on the upper portion of the cylinder 2 from the outside. By fitting the cylindrical portion 13 on the upper portion of the cylinder 2, and welding the top portion 11 with the front end surface of the cylinder 2 by ring projection welding or the like, the bracket 10 and the cylinder 2 are fixed to each other. It is to be noted that the cost of the ring projection welding is lower than that of friction welding. However, the welding method and the welding position are not limited to the aforementioned method and position. Brazing may be performed instead of welding; however, welding provides higher strength than that of brazing.

In this embodiment, the force of receiving the piston 3 does not act on the cylinder 2. In this embodiment, the upper portion of the cylinder 2 has a cylindrical shape, and it is not required to provide a top portion having an inward flange shape at the upper end portion of the cylinder 2, integrally with the cylinder 2. Hence, the cylinder 2 has a simple configuration. The bracket 10 is formed by executing the sheet metal processing on the metal sheet, and the bracket 10 can be formed at low cost by executing the deep drawing processing on the cylindrical portion 13. However, the manufacturing method of the bracket 10 is not particularly limited.

Figure 5:
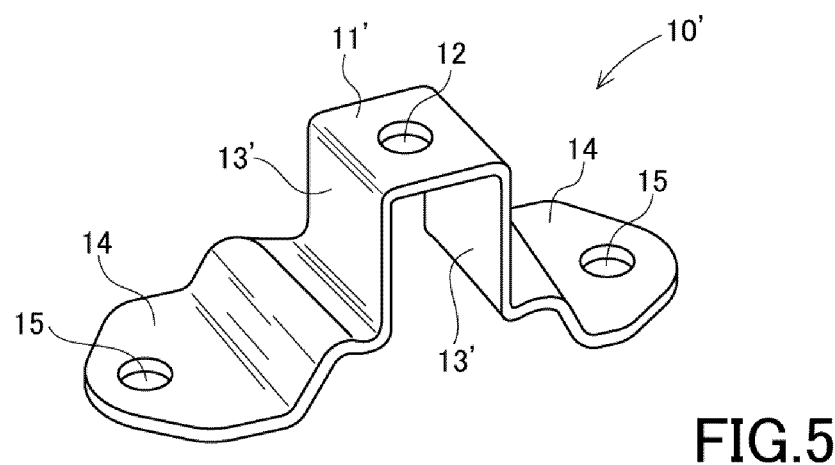
FIG. 5 is a perspective view showing another configuration of a bracket.

In the above-described embodiment, the top portion 11 and the overhanging portions 14 are continuous through the cylindrical portion 13; however, as shown in FIG. 5, a bracket 10' with the following configuration may be used, in which a pair of plate-shaped connection portions 13' extend from both sides of a top portion 11' toward the overhanging portions 14.

In the above-described embodiment, since the cover parts 8 and 9 are configured of the hot-melt synthetic resin, even when the top portion 11' and the connection portions 13' have a substantially angular C shape like the bracket 10' shown in FIG. 5, the upper portions of the cylinder 2 and the bracket 10' can be covered with the cover part 8 in a watertight manner. In the case of the bracket 10 shown in FIGS. 1 to 4, the cover part 8 may be a rubber cap. The hot-melt synthetic resin is not required to be heated in a furnace and hardened unlike potting resin, and hence a covering work is not a troublesome work.

Instead of the bracket 10 or 10', a bracket may be fixed by brazing to overhang from a side surface of the cylinder in the direction along the diameter; however, with the above-described bracket 10, 10', high-cost brazing is not required, and the cost is decreased.

Figure 6:
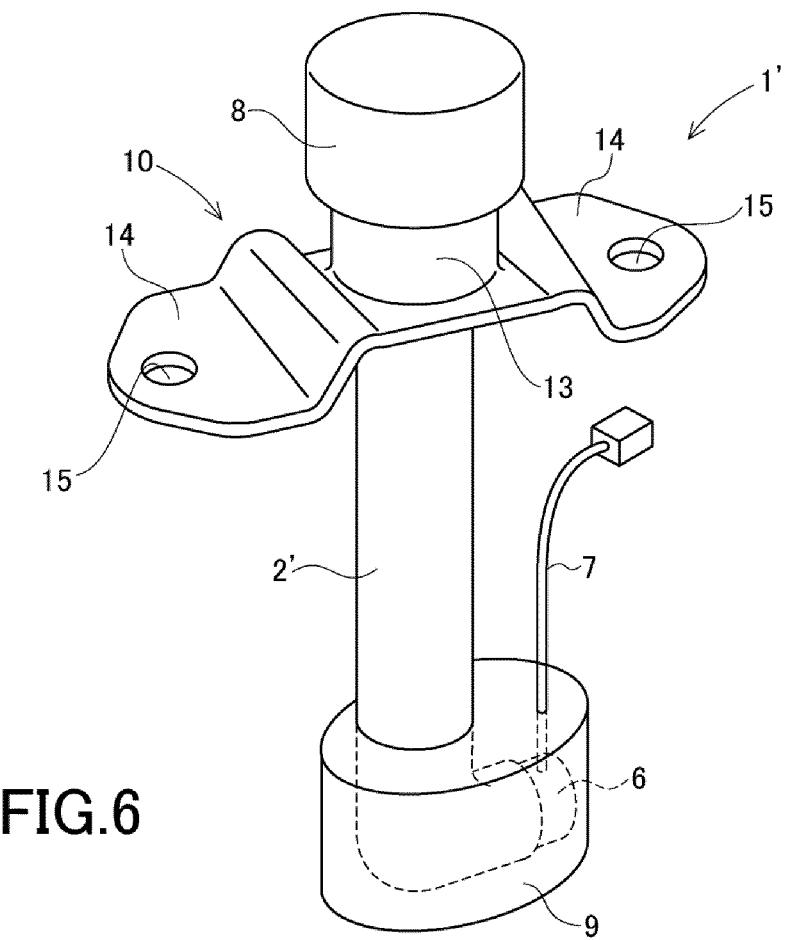
FIG. 6 is a perspective view of a vehicular pop-up hood device according to another embodiment.

In the above-described embodiment, the cylinder 2 has a straight tube shape; however, like a cylinder 2' of a vehicular pop-up hood device 1' shown in FIG. 6, a rear end portion of the cylinder 2' may have a curved shape. The other configuration of FIG. 6 is similar to that of FIG. 1, and the same reference sign denotes the same part.

Figure 7:
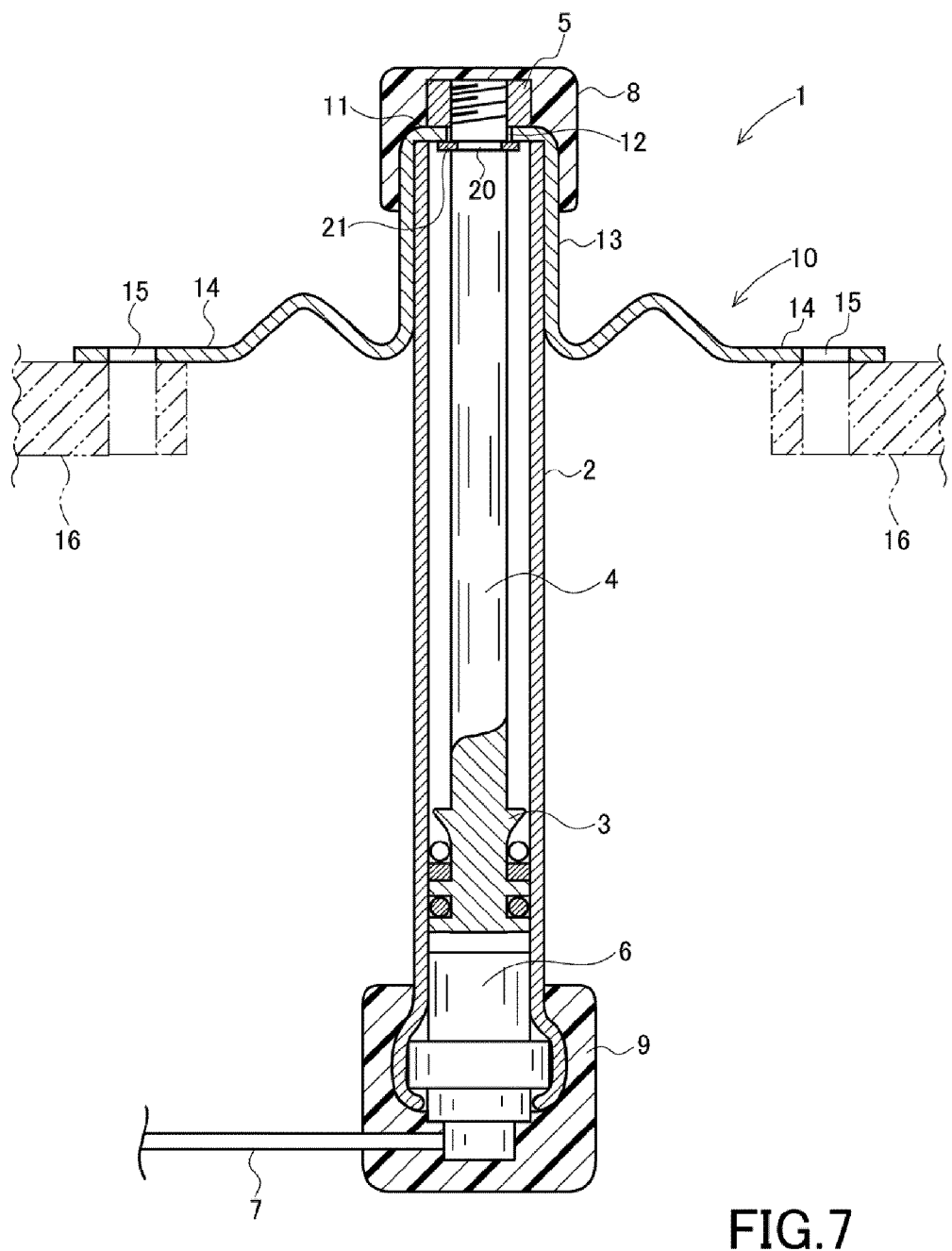
FIG. 7 is a cross-sectional view of a vehicular pop-up hood device according to still another embodiment.

In the above-described embodiment, as shown in FIG. 4, the example in which the harness 7 continuous to the gas generator 6 is routed upward along the outer surface of the cylinder 2 has been described; however, as shown in FIG. 7, the extension direction of the harness 7 from the cover part 9 may be at an angle larger than 0° (in an example in FIG. 7, 90°) with respect to the extension direction of the cylinder 2. A connector portion of the harness 7 connected with the gas generator 6 is embedded in the cover part 9 and pushed in at a side of the gas generator 6.

The above-described embodiments are merely examples of the present invention, and the present invention may be applied to an embodiment other than the illustrated embodiments.

What is claimed is:

1. A vehicular pop-up hood device comprising:
a cylinder; a piston rod that can protrude from a front end of the cylinder; a gas generator to urge the piston rod, the gas generator provided at a side of a rear end of the cylinder; and a bracket to attach the cylinder to a vehicle body,
wherein the bracket includes
a top portion engaged with the front end of the cylinder,
an overhanging portion for attachment to the vehicle body, the overhanging portion overhanging from the cylinder in a direction intersecting with an axial direction of the cylinder, and,
the bracket includes a connection portion continuous to the top portion, extending along the cylinder, and connecting the overhanging portion with the top portion.

2. The vehicular pop-up hood device according to claim 1,
wherein the front end of the cylinder is welded with the top portion.

3. The vehicular pop-up hood device according to claim 1,
further comprising a front-end-side cover part covering a front end portion of the vehicular pop-up hood device and made of hot-melt synthetic resin.

4. The vehicular pop-up hood device according to claim 1, further comprising a rear-end-side cover part covering a rear end portion of the vehicular pop-up hood device and made of the hot-melt synthetic resin.

5. The vehicular pop-up hood device according to claim 4,
further comprising a harness continuous to the gas generator that is routed in a direction toward the front end of the cylinder along an outer surface of the cylinder, and
wherein the harness is embedded in and fixed to the rear-end-side cover part.

6. The vehicular pop-up hood device according to claim 4, wherein a harness is continuous to the gas generator, and a connector portion of the harness connected with the gas generator is embedded in the rear-end-side cover part and is pushed in at a side of the gas generator.

7. The vehicular pop-up hood device according to claim 1, further comprising a front-end-side cover part covering a front end portion of the vehicular pop-up hood device.

8. The vehicular pop-up hood device according to claim 1, further comprising a rear-end-side cover part covering a rear end portion of the vehicular pop-up hood device.

9. A vehicular pop-up hood device comprising:
an actuator including a cylinder, a piston rod that can protrude from a front end of the cylinder, and a gas generator to urge the piston rod, the gas generator provided at a side of a rear end of the cylinder; and
a bracket to attach the actuator to a vehicle body,
wherein the vehicular pop-up hood device includes
a rear-end-side cover part covering a rear end portion of the vehicular pop-up hood device and made of hot-melt synthetic resin,
wherein a harness continuous to the gas generator is routed along an outer surface of the cylinder in a direction toward the front end of the cylinder, and
wherein the harness is embedded in and fixed to the rear-end-side cover part.

* * * * *